Patented Oct. 24, 1950

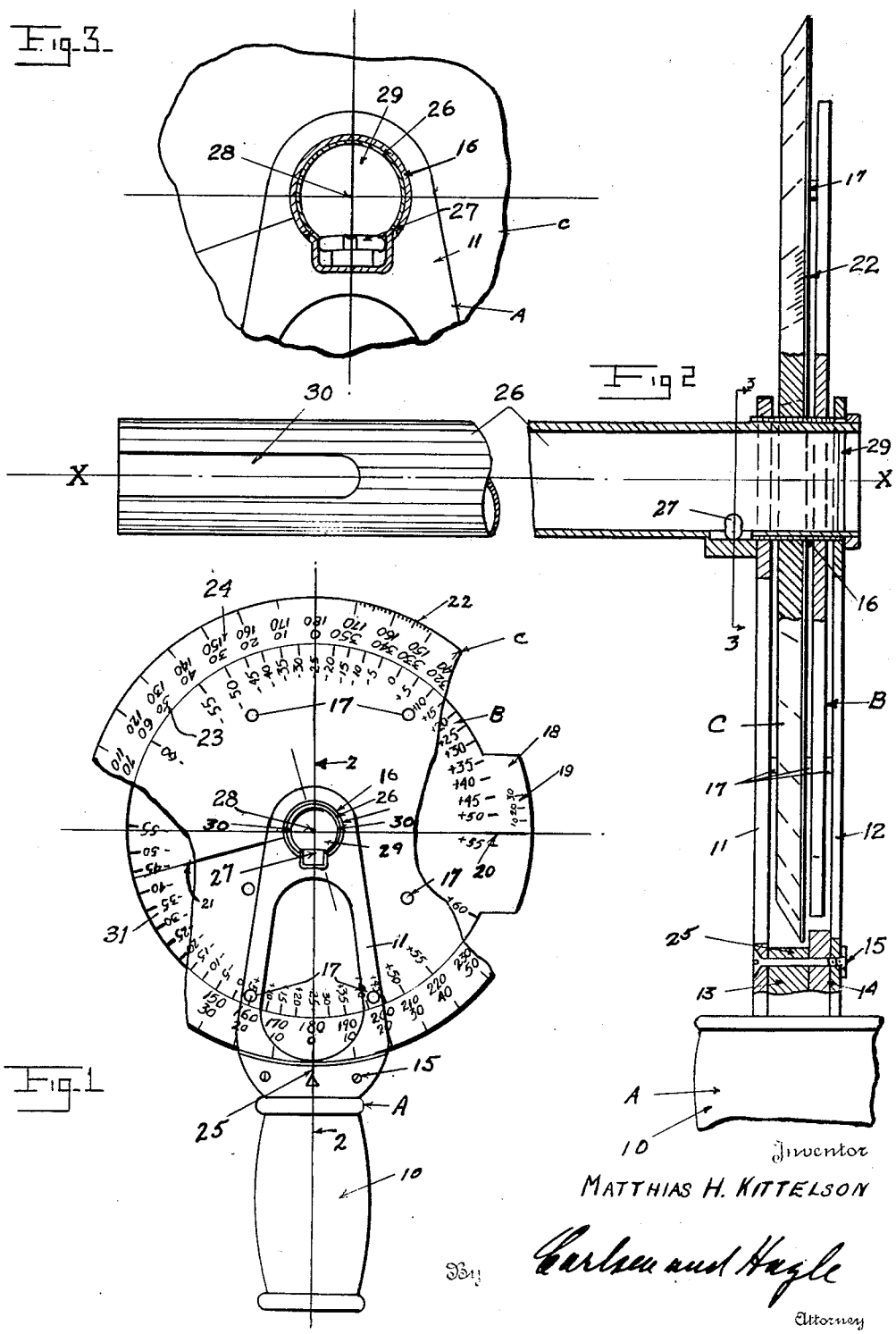

2,527,189

UNITED STATES PATENT OFFICE 2,527,189

CELESTIAL NAVIGATION INSTRUMENT

Matthias H. Kittelson, Minneapolis, Minn.

Application February 8, 1944, Serial No. 521,591

9 Claims. (Cl. 33—64)

This invention relates to the art of celestial navigation and the primary object is to provide a novel, efficient, and practical device which is particularly intended and adapted for air navigation, which will enable the pilot or navigator to quickly and accurately determine his longitude position, and which is also operative to determine the correction to be made, by addition or subtraction, to the sextant angle reading of a celestial body, such as the polar star, in determining the observer's latitude.

A further object is to provide a navigation instrument which is extremely simple in construction and operation and which can be manufactured at comparatively low cost.

A further object is to provide an instrument that can be manipulated with a minimum of effort and by one not possessing a comprehensive knowledge of astronomy, mathematics, or celestial navigation, since no mathematical computations are required in its use, and consequently full knowledge of the essential characteristics and method of operation can be quickly mastered and easily remembered by any person of average intelligence.

Still further and more specific objects will be disclosed in the course of the following specification, reference being had to the accompanying drawings, wherein:

Fig. 1 is an elevation of the device, as seen from the rear or operator's end, with fractional portions of the near disk broken away for purposes of illustration.

Fig. 2 is an enlarged side elevation of the device, partly in vertical diametrical section, as on the line 2—2 in Fig. 1.

Fig. 3 is a sectional elevation as on line 3—3 in Fig. 1.

Figure 4:
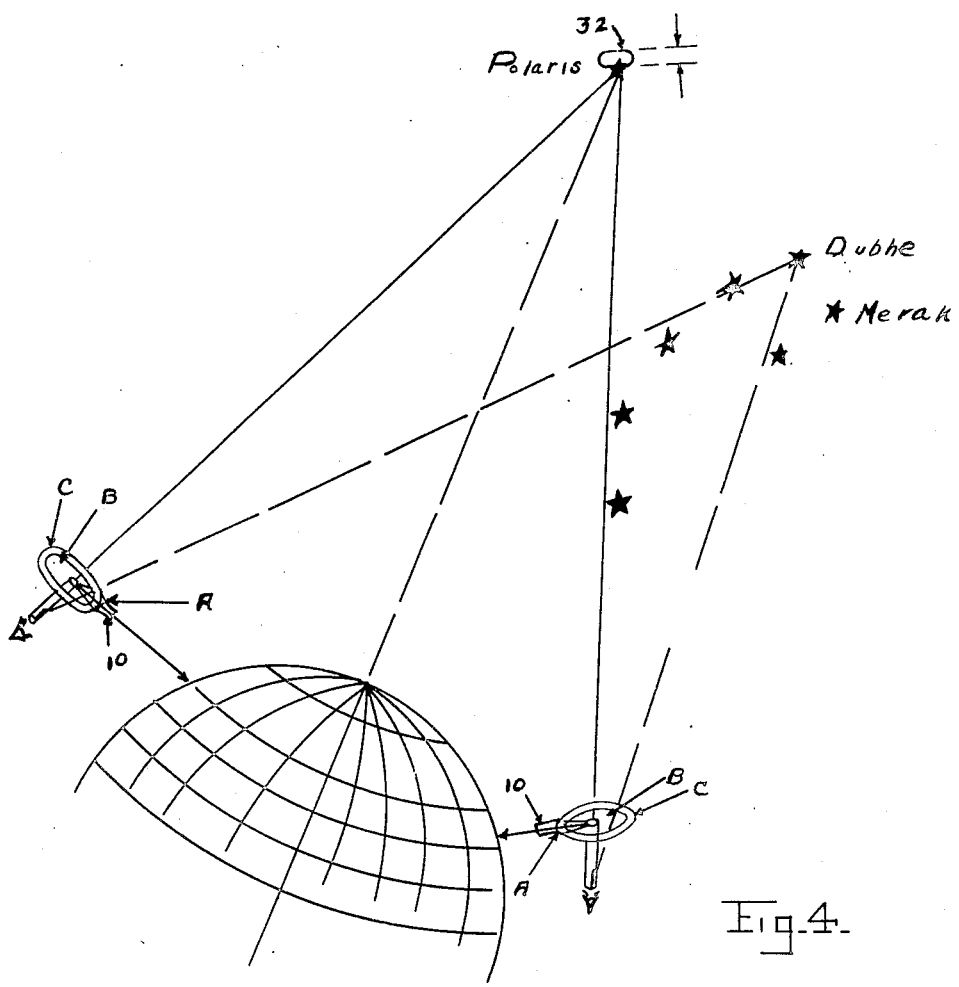
Fig. 4 is a perspective view illustrating somewhat diagrammatically, and with obvious distortions as to relative proportions, how the instrument would be used at two different times and positions in the Northern Hemisphere of the Earth, when sighting and taking readings with respect to Polaris and the stars Dubhe and Merak of the Great Dipper in the constellation of Ursa Major.
Figure 5:
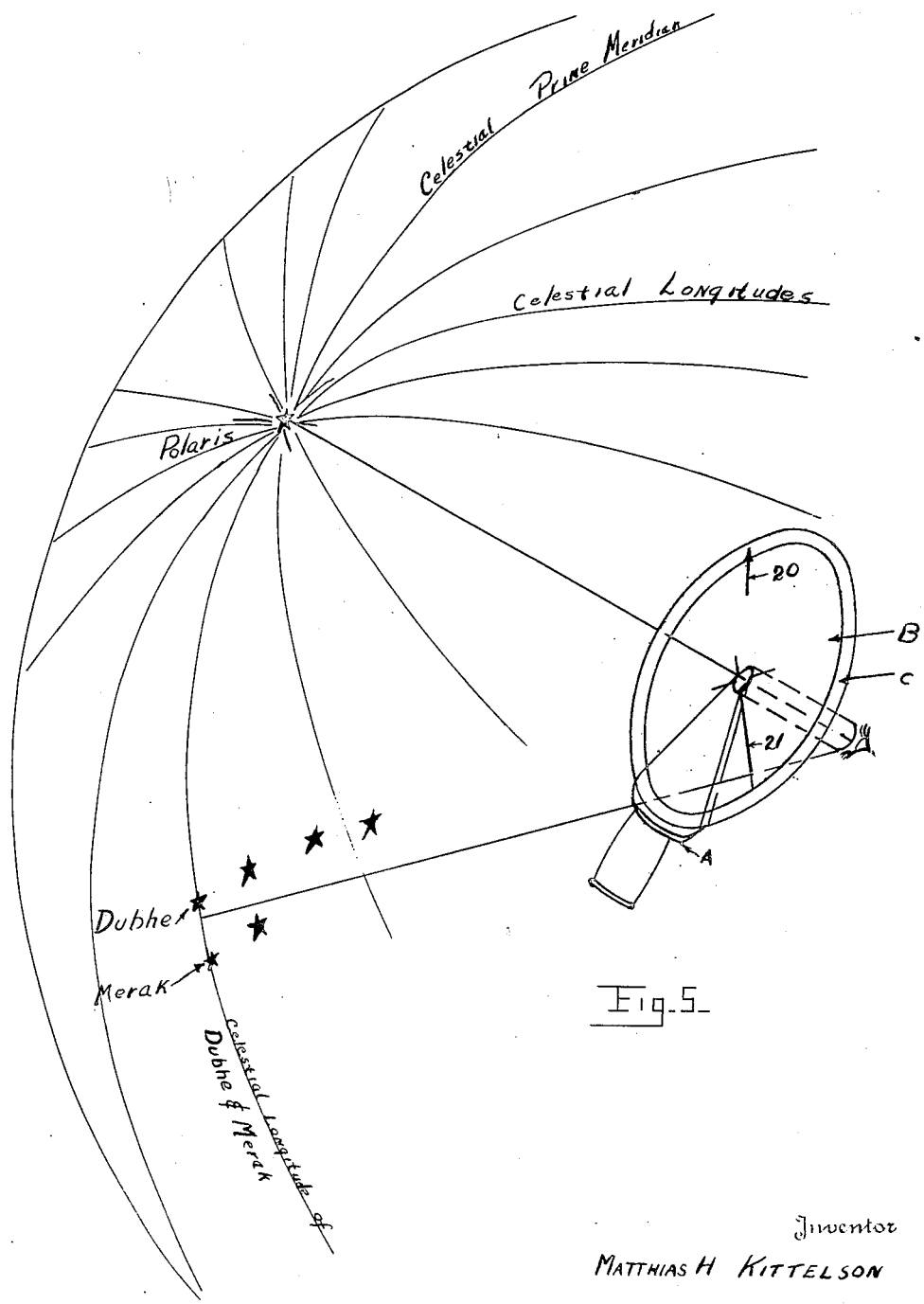
Fig. 5 is a perspective illustration diagrammatically showing, on a distorted scale, the position of the instrument with respect to Polaris, Dubhe and Merak, as seen from above and outside the celestial sphere.

Referring to the drawings more particularly and by reference characters, attention will first be directed to the mechanical construction and physical characteristics of the device proper.

The instrument comprises three essential elements designated generally, and respectively, as a holder A, a primary disk or dial B, and a second disk or dial C, all adjustable, when in operation, about a common axis designated as X—X.

The holder A, as here shown, consists of a convenient handle member 10 from the upper end of which extends two parallel arms 11 and 12, these arms being separated at their handle ends by spacers 13 and 14 (Fig. 2) and secured together by suitable means such as bolts 15. At their upper ends the arms have aligned openings in which is non-rotatably secured a bearing sleeve 16. The holder arms 11—12 are preferably of skeleton construction and are also preferably made of Lucite, Celluloid, glass, semi-flexible glass, or some similar fairly rigid yet transparent substance, so that figures can be read through the material as illustrated in Fig. 1.

The dials B and C are also made of transparent material, not only for the purpose of enabling the operator to read figures and graduations on one dial through the other, but also to permit him to observe the entire celestial area to which he is directing his attention so that he can more easily and effectively sight the stars on which he is to make his instrument adjustments. It may here be noted that the members B and C need not necessarily be made of transparent material but might conceivably be made of metal or other opaque or translucent substances. In that case, however, it would be quite necessary or at least very advantageous to sufficiently skeletonize the members so that the observer could recognize the celestial field in which he is making his observations. For these reasons the word "transparent" will herein be used in a broad sense to designate members through which the operator may see objects beyond, whether the particular member in question is of skeleton construction or made of transparent material.

The dials B and C are mounted for rotation on the bearing sleeve 16 in such manner that they may be rotated with respect to each other and also with respect to the holder A. A series of small felt pads 17 are secured at spaced intervals, some to the arms 11 and some to one of the dials. These pads serve as spacers between the elements 11, C, B, and 12, and also provide frictional contact between these members whereby they will yieldingly retain their rotatably adjusted positions when in use, and particularly between the times that observations have been made and readings have been taken.

To facilitate turning of the dials it may be noted that dial C is of somewhat larger diameter than dial B, thus providing a peripheral extension or flange which may readily be engaged with the fingers of one hand while the other hand grasps the handle 10 when the instrument is in use, to hold it up before the operator's sighting eye. For a similar reason the dial B is provided with a projecting sector or tab 18 (Fig. 1) which provides a convenient extension for circularly adjusting the dial C by manual manipulation. This tab 18 also serves as a convenient area for the imprint or impression of a scale 19 and a radial or pointer marking 20, the scale 19 having graduations which serve as a vernier to permit more accurate reading of the arrow or index 20 relative to the scale 23 designating the Greenwich hour angle on disk C. The disk or dial B also carries a sight line 21 which extends radially and its purpose will presently be described.

The dial C has a beveled peripheral edge scaled into 360 degree markings or graduations 22 (some of which are omitted in the drawing), with an inner Greenwich Hour Angle scale 23, having ten degree readings running counter-clockwise, and having an outer scale 24 associated with the markings 22 and reading in both directions to 180 degrees representing degrees of Longitude East and West, starting at the 180 degree point in the inner scale. Readings are taken from these scales at the fixed point marker 25 which, in the present instance, is conveniently located in the holder A, as shown in Figs. 1 and 2.

With further reference to the structural or mechanical aspects of the instrument it will be noted that a tube 26 of substantial length and size extends from the bearing sleeve 16. This tube is rigidly secured in the sleeve, so as to be maintained in fixed axial alignment therewith, and is also non-rotatable in the sleeve so that it will oscillate with the sleeve and with the holder A when the latter is adjusted about the axis X—X. Within the tube 26 and preferably adjacent the forward end thereof is a spirit level 27 by which the operator can readily determine when the holder is in proper position, i. e., that the marker 25 is in the vertical plane of axis X—X, as that is a critical factor in the proper operation of the device.

It may here be noted that it is obviously necessary to tilt the instrument to various angles when being used, and therefore the sighting axis X—X is subject to wide range of altitude adjustment. On the other hand it is equally important that the readings determined by rotative adjustments of the dials be made with respect to the earth's surface at the point where the observation is being made, and for that reason gravity is here utilized to determine the proper operative position of the holder A. It will be evident that any similar well known devcie, such for instance as a plumb, may be used to accurately position the holder and need not necessarily be placed in the tube 26. The reason for locating the level 27 in the tube 26, in the present instance, is to enable the observer to more readily view it while sighting the star when looking through the tube and without appreciably shifting his sight line which is coincident with axis X—X.

To assist the operator in accurately centering the observed celestial body through tube 26 its forward end is provided with diametrically crossed "hair lines" 28, and these may be placed on a glass or lens 29 in the front end of the tube. This or other lenses may have telescopic powers but that is unnecessary to consider in connection with the disclosure of the primary concepts of this invention.

It may also be explained that the use of a tube such as 26 is not an absolute necessity in the practical operation of the instrument, but is considered of substantial merit since it insures that the sight line will be properly maintained coaxially with the dials, and thereby prevents the dials from being inadvertently angled with respect to the sight line which should be as near as possible to the perpendicular with respect to the surfaces of the dials. In fact I have found through actual use of the instrument that a tube such as 26 is not a critical necessity, providing, however, that the bearing sleeve 16 is reduced to small internal diameter. In such instances a center aperture of not more than 1/8 inch diameter is very practical and in such case cross hairs, like 28, may be entirely dispensed with.

The rear or eye end of the tube 26 is preferably also provided with lateral slots or openings 30 through which the operator may see substantial side portions of the disks without removing the tube from sighting position in front of his eye.

In its broader aspects the present invention is capable of use in either hemisphere and may be used on any feasible star available for navigation purposes; and by adding or modifying the instrument somewhat it is capable of use with various "polar stars." In its simpler and more practical embodiment, however, it is calibrated for use with predetermined stars. In the present instance, and to simplify explanation of its operation, the instrument is shown as scaled for the star Polaris.

In the use and operation of the instrument it is first necessary to determine from a standard almanac, and for the particular time at which the observation is to be made, the number of degrees that the First Point of Aries (r) lies west of Greenwich. In the instrument, as here shown, the First Point of Aries is represented by the arrow 20 on dial B. When this angular distance is known the dial B is turned until the pointer 20 reaches the degree angle as determined by a reading of the scale 23 which is the inner scale on dial C. The dial C is representative of the earth and the zero in this scale 23 represents the Prime meridian of Greenwich. Since this scale is divided into three hundred sixty degrees it will show the Greenwich Hour Angle (GHAr) to the First Point of Aries. Thus if GHAr is fifty degrees at the time the sight is to be taken the (FP Aries) arrow 20 is placed at fifty on the scale 23 and will thus locate the relative positions of the earth's prime meridian and the meridian through the First Point of Aries, sometimes referred to as the celestial prime meridian, it being understood that the dial B is representative of the celestial sphere just as dial C represents the earth.

With the two disks or dials thus adjusted with respect to each other the instrument is now held up before the observer's sighting eye and adjusted until Polaris is sighted through the tube 26. Both disks B and C are then turned simultaneously until the line or marker 21 is superimposed upon the stars Dubhe and Merak. Since the celestial longitude of Dubhe and Merak is at a known and predetermined angle with respect to the Celestial Prime Meridian (r) the arrow 20 and line 21 may be immovably fixed on dial B.

The operator next directs his attention to the spirit level 27 and by it determines when the holder A is in proper position, i. e., when the center marker 25 is in the vertical plane passing through the axis X—X, or center of sight aperture. As a final precaution Polaris is centered by the cross hairs 28 and the line 21 is again checked with respect to Dubhe and Merak, while the level 27 is also watched to make certain that all parts are properly adjusted. The instrument can then be taken down from sighting position there being sufficient friction between the various parts to hold them against displacement until readings have been taken.

The actual longitude of the observer is determined by merely reading the position of marker 25 on the scale 24. This scale is graduated 180 degrees in both directions from zero, the scale going clockwise from the zero or Greenwich point marking the West Longitude degrees, and the scaling running counterclockwise marking the East Longitude degrees. It will be understood that when the instrument is in sighting position and all adjustments have been made the position of the zero in scale 23 corresponds with the vertical projection of the earth's zero longitude to the celestial polar region and also its corresponding point in the instrument. The distance in arc of longitude between Greenwich and the observer is consequently the same as that between zero on scale 23 and upper or perpendicular point of the dial. For sake of convenience, and to eliminate the necessity of a fixed pointer at the top of the instrument, the scales 24 are inscribed on dial C, one hundred eighty degrees from normal position, thus permitting readings to be more conveniently taken at the bottom of the instrument, as at 25.

Since Polaris moves in an orbit, indicated at 32 in Fig. 4, which is sufficient in extent to cause a position variation of approximately one hundred twenty two nautical miles on the earth's surface, corrections must be made when using this star as a navigation guide. Such correction is added or subtracted from the Sextant angle reading and is particularly necessary in determining the true latitude of the observer.

This operation can be performed very accurately when the local hour angle of the star, in this case Polaris, is known. The local hour angle is the angle between the celestial longitude vertically above the observer and the longitude in which the star lies. The distance in angular arc from the celestial longitude of Polaris to the celestial longitude of Dubhe and Merak is known. Therefore by noting the arcuate distance from the observer's zenith point to Dubhe and Merak the position of Polaris in its orbit relative to the observer is all predetermined. Using Polaris as a center, sighting through tube 26, the sight line 21 is superimposed on the stars Dubhe and Merak, and because of their distance from the projected pole these starts determine the position of Polaris quite accurately.

The proper Polar star correction for Latitude to be added or subtracted from the sextant reading is read through the disk C from the scale 31 on disk B above the pointer 25. These corrections are precomputed and arranged on the disk B, in their proper relative positions to the Dubhe and Merak line and the First Point of Aries, and are marked minus or plus. On the present instrument they are laid out at the proper intervals to come out on five minute or five mile (nautical) corrections, this being to avoid complexity.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A navigation instrument comprising a sighting tube, a dial rotatably mounted at one end of the tube, said dial having a longitude calibrated scale thereon, a marker point fixed with respect to the sighting tube for determining readings to be made from the scale, and gravity responsive means for determining when the marker point is in proper predetermined position with respect to the vertical plane of the tube axis, said gravity responsive means including a spirit level mounted within the sighting tube transversely thereof whereby it may be seen by the sighting eye of the observer when looking through the tube and positioning the instrument with respect to a celestial body.

2. A navigation instrument comprising a sighting tube, means mounted for relative rotation at one end of the tube for scaling celestial observations, and a spirit level mounted transversely within the tube adjacent the axial sighting line therethrough whereby the level may be seen by the observer while his eye is focused in the sighting line through the tube.

3. In a navigation instrument a holder having a handle by which it may be held up before an observer's eye, a sighting tube extending rigidly from the holder, a dial rotatably adjustable in the holder, coaxially with the sighting tube, and having a peripherally arranged scale, a marker point on the holder for reading association with the scale, a gravity responsive device operative to indicate alignment of a predetermined axial plane of the tube with the vertical, said device being disposed within the tube and so located therein that it may be observed by the observer while looking through the tube to align it axially with a celestial body, whereby the tube and holder may be tilted about the axis of the tube until said marker point on the holder is in predetermined position with respect to the vertical plane of the tube at the time the observation is made.

4. In a navigation instrument a holder adapted to be hand supported and held up before an observer's eye, a sighting tube extending rigidly from the holder, a dial rotatably secured to the holder, coaxially with the sighting tube, and having a longitude calibrated scale, a marker point on the holder for reading association with the scale to indicate the GHA of the observer, a gravity responsive device for indicating alignment of a predetermined axial plane of the tube with the vertical and so located that it may be observed by the observer while looking through the tube to align it axially with a celestial body, whereby the tube and holder may be tilted about the axis of the tube until said marker point on the holder is in predetermined position with respect to the vertical plane of the tube at the time the observation is made, and a member rotatably adjustable adjacent the dial, with two relatively fixed peripherally spaced markers for adjusting the dial scale to conform it with a predetermined relative position of the celestial prime meridian.

5. A navigation instrument comprising a sighting tube and holder, and pair of transparent dials rotatable with respect to each other and the tube about an axially disposed sighting aperture through which a celestial body may be observed to align the instrument with such body, one of said dials having an annular scale graduated for longitude and the other dial having indicia readable in connection therewith whereby the dials may be relatively adjusted to produce a scale reading for defining a longitude arc angle between Earth's Prime Meridian and the Celestial Prime Meridian, said other dial also having a marker outward of the axis for lateral sighting alignment with another celestial body while sighting alignment with the first noted celestial body is being maintained, said indicia being fixed with respect to the sight marker, for determining the angular distance of the First Point of Aries with reference to Earth's Prime Meridian, and a marker carried by the holder for determining a reading, on the first dial, of the operator's earth longitude position.

6. A navigation instrument comprising a pair of transparent dials and a holder all rotatable with respect to each other about an axially disposed sighting aperture adapted to be aligned with a given celestial body, one of said dials having an annular scale for indicating distance in arc of longitude between Earth and Celestial Prime Meridians, said other dial also having a marker associated with said scale, said other dial also having a sight marker outward of the axis thereof for lateral sighting alignment with another celestial body, while the first noted alignment is being maintained, to establish a fixed rotational position of both dials about the sighting axis, said first dial having a second scale for indicating degrees of longitude with respect to Greenwich, said holder having a marker associated with said second scale, and gravity responsive means for indicating when a given point on the holder is aligned with a vertical axial plane of the sighting aperture.

7. A celestial navigation instrument comprising a holder adapted to be manually supported and held up before the observer's eye for sighting a celestial body, means supported by the holder defining a rear sighting aperture, a dial spaced forwardly from said aperture and rotatably attached to the holder concentrically about the sighting axis thereof, said dial representing the earth and having a scale indicating longitudes with respect to Greenwich, a second dial rotatably mounted with respect to and adjacent the first dial, said second dial representing the celestial sphere and having two relatively fixed markers peripherally spaced to correspond to the distance in arc of celestial longitude between a preselected second celestial body and First Point of Aries, one of the said markers being disposed for adjustable sighting alignment with said second celestial body while the holder is axially sighted against the first noted celestial body, gravity responsive means for determining the correct tiltable position of the holder about the vertical plane of the sighting axis, and a marker carried by the holder for indicating on the scale the Greenwich hour angle of the observer.

8. A navigation instrument comprising a pair of transparent dials and a holder all rotatable with respect to each other about an axially disposed sighting tube through which a celestial body may be observed to align the instrument with such body, one of said dials having an annular scale graduated for longitude and the other dial having indicia readable in connection therewith whereby the dials may be relatively adjusted to produce a scale reading and defining a given longitude arc angle between Earth's Prime Meridian and the Celestial Prime Meridian, the other of said dials also having a sight marker for sighting alignment with another celestial body while sighting alignment with the first noted celestial body is being maintained, said indicia being fixed with respect to the sight marker, for determining the angular distance of the First Point of Aries with reference to Earth's Prime Meridian, and a marker carried by the holder for determining a reading on the first dial of the operator's earth longitude position with the holder held in a predetermined position with respect to the vertical axial plane of the tube during the sighting operation, said second dial being provided with a precomputed latitude correction scale coordinated with the sight marker on the second dial, and reading of which is determined by the marker on the holder, to reconcile sextant readings with predetermined orbit movements of the first mentioned celestial body.

9. A celestial navigation instrument comprising a holder having a marker, a sighting device carried by the holder for sighting alignment with a primary celestial body, two dials rotatably supported by the holder concentrically with respect to the sighting device, one of said dials having a marker for sighting alignment with a secondary celestial body concurrently with the aligning of the sighting device with the primary celestial body, to determine the observer's relative position with respect to both celestial bodies and the prime meridian of the celestial sphere, the other of said dials having a scale adjustable with respect to the first mentioned dial to determine the position of Greenwich with respect to the celestial prime meridian, and gravity responsive means for indicating alignment of a predetermined plane fixed relative to the holder and passing through the sighting axis for the primary celestial body with the vertical whereby the marker thereof will indicate on the said scale the Greenwich hour angle of the observer, the first mentioned of said dials having a correction scale movable with respect to the scale on the other dial to conform sextant angle readings with predetermined orbit movements of one of the observed celestial bodies.

MATTHIAS H. KITTELSON.

REFERENCES CITED

The following references are of record in the file of this patent:

UNITED STATES PATENTS

| Number | Name | Date |
|---|---|---|
| 13,584 | Stinson | Sept. 18, 1855 |
| 1,919,222 | Jensen et al. | July 25, 1933 |
| 2,141,696 | Rodd et al. | Dec. 27, 1938 |
| 2,309,930 | Byerly | Feb. 2, 1943 |

FOREIGN PATENTS

| Number | Country | Date |
|---|---|---|
| 14,965 | Sweden | Nov. 8, 1902 |